United States Patent
Tabatowski-Bush

(10) Patent No.: US 9,656,570 B2
(45) Date of Patent: May 23, 2017

(54) CURRENT SENSOR FOR A VEHICLE

(71) Applicant: Ford Global Technologies, LLC, Dearborn, MI (US)

(72) Inventor: Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 14/570,117

(22) Filed: Dec. 15, 2014

(65) Prior Publication Data

US 2016/0167540 A1    Jun. 16, 2016

(51) Int. Cl.
*H02J 7/00* (2006.01)
*B60L 11/18* (2006.01)

(52) U.S. Cl.
CPC ....... *B60L 11/1861* (2013.01); *Y02T 10/7005* (2013.01)

(58) Field of Classification Search
CPC .................................................. H02J 7/0031
USPC ......................................................... 320/136
See application file for complete search history.

(56) References Cited

U.S. PATENT DOCUMENTS

| | | | |
|---|---|---|---|
| 6,331,762 B1 * | 12/2001 | Bertness | G01R 31/3627 320/134 |
| 6,498,577 B1 | 12/2002 | Lin | |
| 6,501,241 B1 * | 12/2002 | Tsurumi | B60K 6/26 318/430 |
| 6,977,603 B1 | 12/2005 | Barna et al. | |
| 7,432,839 B2 | 10/2008 | Christ | |
| 9,316,693 B2 * | 4/2016 | Benjamin | G01R 31/3606 |
| 2005/0012496 A1 * | 1/2005 | Taniguchi | G01R 15/181 324/117 R |
| 2009/0284214 A1 * | 11/2009 | Arthur | H01M 8/04298 320/101 |
| 2012/0176262 A1 | 7/2012 | Chen et al. | |
| 2013/0204560 A1 * | 8/2013 | Lo | G01R 31/361 702/63 |
| 2013/0229154 A1 * | 9/2013 | Benjamin | G01R 31/3606 320/132 |
| 2013/0285460 A1 * | 10/2013 | DeHaven | H02M 3/285 307/82 |
| 2014/0091740 A1 * | 4/2014 | Suzuki | H02P 29/027 318/400.02 |
| 2014/0091742 A1 * | 4/2014 | Suzuki | H02P 29/027 318/400.22 |
| 2014/0091744 A1 * | 4/2014 | Suzuki | H02P 6/12 318/400.22 |
| 2014/0103844 A1 * | 4/2014 | Omata | H02P 6/10 318/400.23 |

(Continued)

*Primary Examiner* — Suresh Memula
(74) *Attorney, Agent, or Firm* — David Kelley; Brooks Kushman P.C.

(57) ABSTRACT

A vehicle includes a battery configured to operate at a current, during a drive cycle, in a nominal current range for a time greater than in a maximum current range. A controller is programmed to output a voltage based on the current according to a gain calibrated to be greater in the nominal current range than in the maximum current range to increase resolution in the nominal current range. The gain may be based on an exponential function or piecewise linear function of the current. The gain may increase as a magnitude of the current increases. A second controller receives the voltage and derives a battery current according to an inverse of the gain.

20 Claims, 4 Drawing Sheets

(56) References Cited

U.S. PATENT DOCUMENTS

| | | | | |
|---|---|---|---|---|
| 2014/0184114 A1* | 7/2014 | Omata | ............ | H02P 6/08 |
| | | | | 318/400.02 |
| 2015/0123578 A1* | 5/2015 | Schulz | ............ | H02P 23/14 |
| | | | | 318/400.04 |
| 2015/0160298 A1* | 6/2015 | Tabatowski-Bush | | G01R 27/2611 |
| | | | | 324/426 |
| 2015/0231985 A1* | 8/2015 | Li | ............ | B60L 11/1862 |
| | | | | 320/134 |
| 2015/0231986 A1* | 8/2015 | Li | ............ | B60L 11/123 |
| | | | | 701/22 |
| 2015/0232083 A1* | 8/2015 | Yu | ............ | B60W 20/106 |
| | | | | 701/22 |
| 2015/0352972 A1* | 12/2015 | Li | ............ | G01R 31/3648 |
| | | | | 701/22 |

* cited by examiner

CURRENT SENSOR FOR A VEHICLE

TECHNICAL FIELD

This application generally relates to current measurement systems for vehicles.

BACKGROUND

A hybrid-electric or all-electric vehicle includes a traction battery constructed of multiple battery cells in series and/or parallel. The traction battery provides power for vehicle propulsion and accessory features. Such vehicles may also include an electric machine driven by a power electronics module. To operate the battery and the electric machine, the amount of current flowing to or from the battery may be measured by a current sensor. The current sensor value may be used to compute a battery state of charge.

SUMMARY

A vehicle includes a battery configured to operate at a current, during a drive cycle, in a nominal current range for a time greater than in a maximum current range. The vehicle further includes a controller programmed to output a voltage based on the current according to a gain calibrated to be greater in the nominal current range than in the maximum current range to increase resolution in the nominal current range. The gain may be based on an exponential function of the current. The gain may be based on a piecewise linear function of the current. The gain may be such that a ratio between a change in the voltage and a change in the current decreases as a magnitude of the current increases. The vehicle may further include a second controller programmed to receive the voltage and operate the battery according to a battery current derived from the voltage. The battery current may be derived from the voltage based on an inverse of the gain. The second controller may be further programmed to, in response to conditions indicative of the current being zero, measure a zero current voltage and further derive the battery current based on the zero current voltage.

A battery management system includes a controller programmed to measure a current from a battery configured to operate, during a drive cycle, at the current that is in a nominal current range for a time greater than in a maximum current range, and output a voltage based on the current according to a gain calibrated to be greater in the nominal current range than in the maximum current range. The gain may be based on an exponential function of the current. The gain may be based on a piecewise linear function of the current. The gain may be such that a ratio between a change in the voltage and a change in the current decreases as a magnitude of the current increases. The battery management system may further include a second controller programmed to receive the voltage and operate the battery according to a battery current derived from the voltage. The battery current may be derived from the voltage based on an inverse of the gain. The second controller may be further programmed to, in response to conditions indicative of the current being zero, measure a zero current voltage and further derive the battery current based on the zero current voltage.

A method includes measuring, by a controller, a current from a battery configured to operate at the current that is in a nominal current range for a time greater than in a maximum current range. The method further includes outputting, by the controller, a voltage based on the current according to a gain calibrated to be greater in the nominal current range than in the maximum current range. The gain may be based on an exponential function of the current. The gain may be based on a piecewise linear function of the current. The gain may be such that a ratio between a change in the voltage and a change in the current decreases as a magnitude of the current increases. The gain may be calibrated such that a resolution of the current as represented by the voltage is greater in the nominal current range than in the maximum current range. The method may further include receiving, by a second controller, the voltage, and operating, by the second controller, the battery according to a battery current derived from the voltage.

The analog voltage as described herein improves the accuracy of the signal representing the current in a pre-defined current range in which the vehicle may operate more frequently. A signal to noise ratio of the analog voltage representing the current is increased for a range of currents. The improved accuracy in the current value improves the accuracy of those values derived from the current such as the battery state of charge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
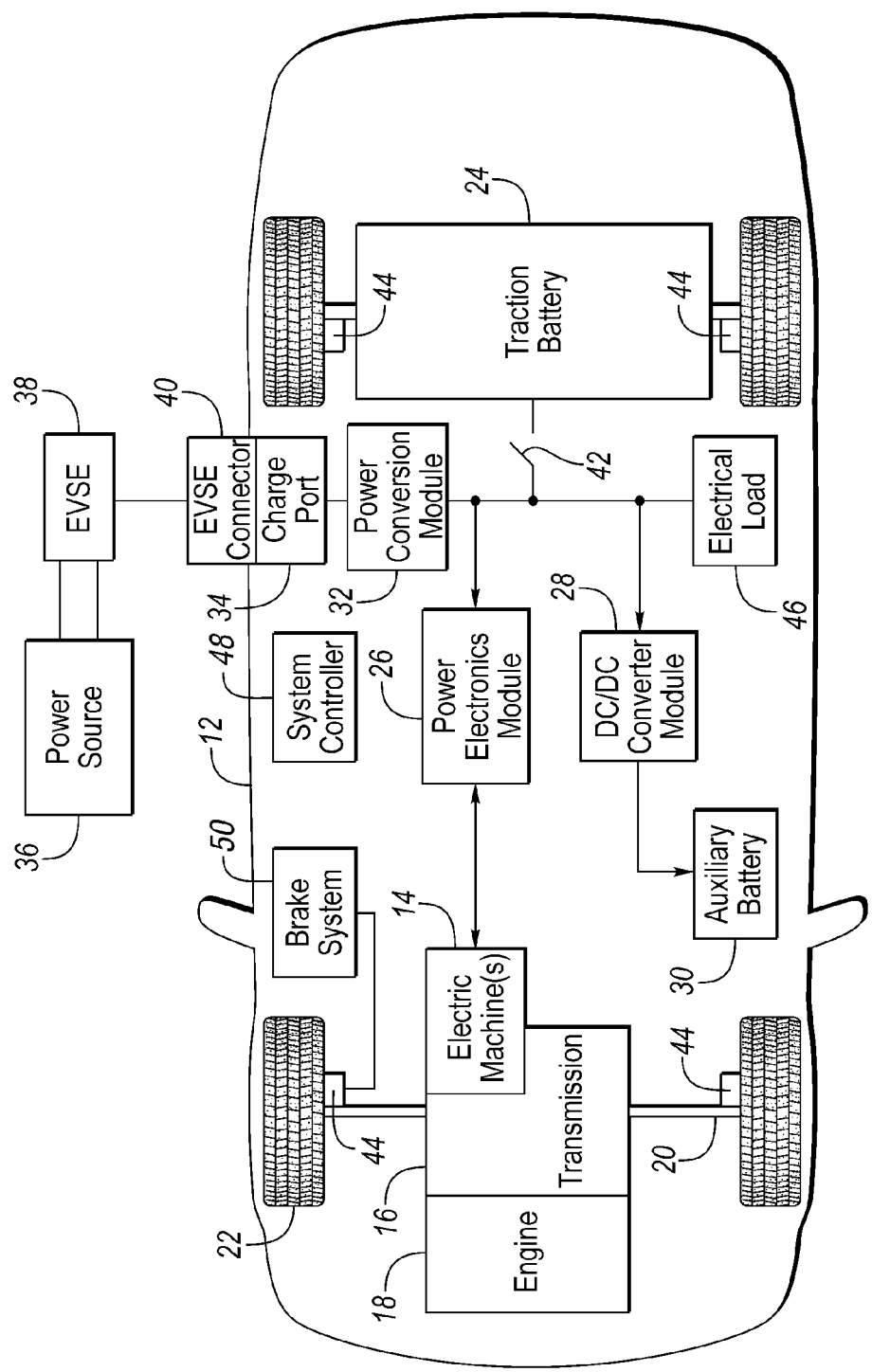
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

Figure 2:
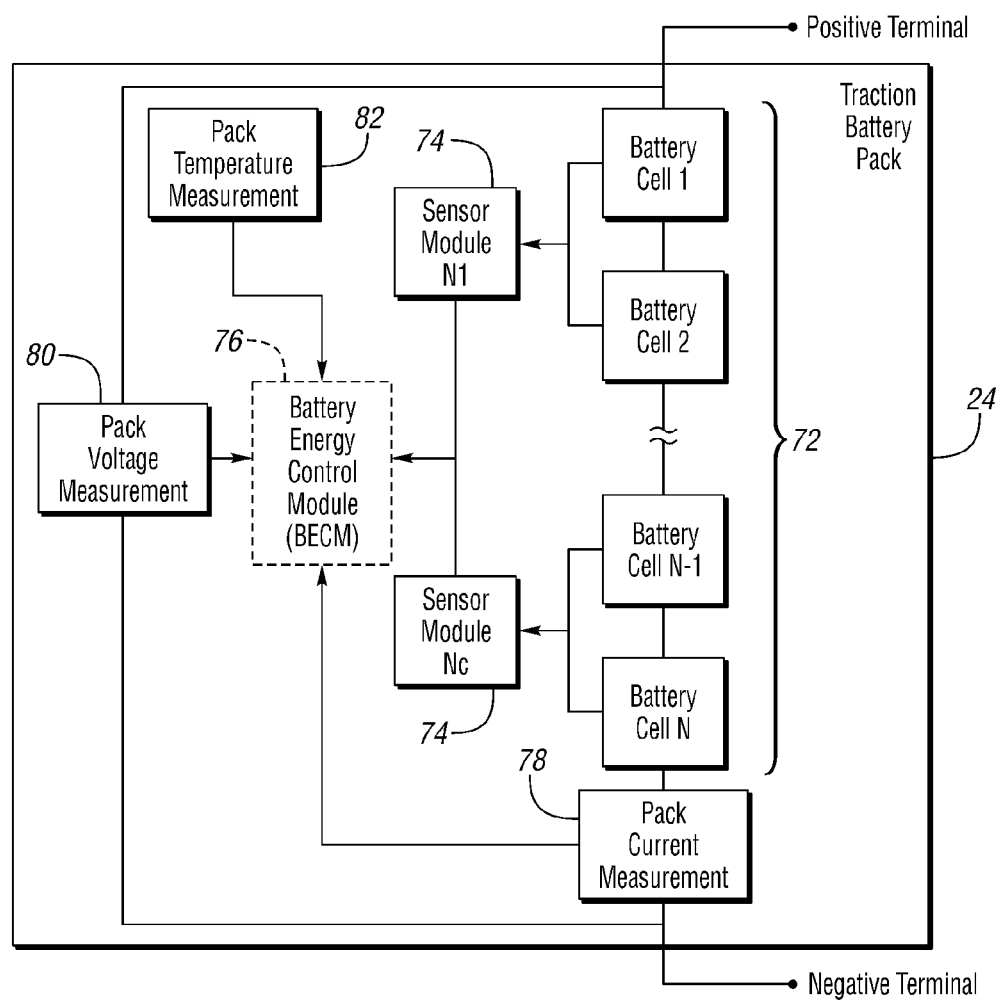
FIG. 2 is a diagram of an exemplary battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may monitor several battery pack level characteristics using various sensors and associate circuitry that may include a pack current sensor 78, a pack voltage sensor 80 and pack temperature sensor 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. The battery management system may use a sensor module 74 to measure the battery cell 72 characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration. The accuracy of the current measurement may affect the accuracy of the battery SOC calculation.

The current sensor 78 may be used to measure the current flowing to and from the battery pack 24. The current sensor 78 may be based on a Hall effect device.

Current measurements may be used for a number of control features within the vehicle. The battery pack current may be used for calculating battery SOC and setting battery power limits. The battery pack current may be used in closed-loop control of the electric machines (e.g., Torque Control). Because of the extensive use of the battery pack current, it is desired to have an accurate current measurement. Improved current measurement accuracy may lead to improvements in vehicle performance, range, and fuel economy.

Prior art current sensors present an analog signal that is scaled in a linear fashion. The linear scaling has a uniform gain throughout the entire current range. That is, a ratio of the analog voltage output to the current input is typically constant throughout the measurement range. For example, a current sensor may have a range of −200 Amps to +200 Amps. The voltage output at +200 Amps may be 5 Volts. The uniform gain of the current sensor may be defined as a ratio of the maximum voltage range to the maximum current range. The gain provides a transfer function that may be applied to current values to determine the output voltage of the current sensor. The gain for a prior art current sensor may be constant.

An issue with the linear scaling is that all current values are treated the same. That is, the gain at low currents is the same as the gain at high currents. It may be observed that an electrified vehicle may spend more time operating at lower current ranges than at high current ranges. The traction battery may be configured to operate at a current in a nominal current range for a time greater than in a maximum current range greater than the nominal current range. The nominal current range may be a range of currents at which the vehicle most frequently operates. For example, the vehicle may operate more frequently with battery currents less than 50 Amps (e.g., nominal current range is 0 to 50 Amps). The maximum current magnitude may be up to 200 Amps (e.g., maximum current range is 100 Amps to 200 Amps). Based on this observation, it is apparent that improving current sensor accuracy at lower currents may improve the performance of functions that utilize the current sensor value. Any degradation in the accuracy at higher current values will have limited effect on the performance since less time is spent operating in the high current range.

The effects of a small decrease in accuracy at high currents (for instance, 100 Amps or 200 Amps) may be considered. One would not expect a serious degradation in the amp-hour integration accuracy due to the relatively small amount of time spent operating in the high current range. However, there may be accuracy impacts for other battery controls computations, such as instantaneous power, due to this small amount of additional error at higher currents. There are several factors that may allow a battery system designer to make this tradeoff and arrive at acceptable system performance. First, the acceptable error at high currents tends to be higher anyway (for instance, 2 or 3 Amps for a 200 Amp battery pack). Since the error may normally be stated as a percentage of the full-scale value, it is normal that the magnitude of the error is greater as the current approaches the full-scale value. Next, a limiting factor for current accuracy in the higher current range is likely to be instantaneous published power accuracy. So long as the required accuracy on the instantaneous published power is met, there is no net system effect. Since the accuracy of the measured pack voltage is not affected, it may still be possible to meet a typical published power accuracy target even with decreased pack current accuracy at high currents. Finally, the largest impact at high currents due to this change may be from electrical noise on the analog signal. Such electrical noise tends to be zero-average, so some attention to filtering (e.g., make sure to meet the Nyquist criterion) may alleviate this potential problem.

It should be noted that Plug-In Hybrid Vehicles (PHEV) and Battery Electric Vehicles (BEV) typically run higher average currents from the battery pack compared to a Full Hybrid-Electric Vehicle (FHEV). The numerical examples provided (for instance, the definition of the low-current range as 50 Amps and below, and the maximum current range of 100 Amps to 200 Amps) are with the FHEV use case in mind. However, the same discussion holds true for PHEV and BEV, but with a wider definition of the ranges. For instance, a BEV high current range might be 400 A and above. Any ranges discussed for high-current and low-current operation are exemplary and the ranges are expected to change depending the on the type of vehicle.

Figure 3:
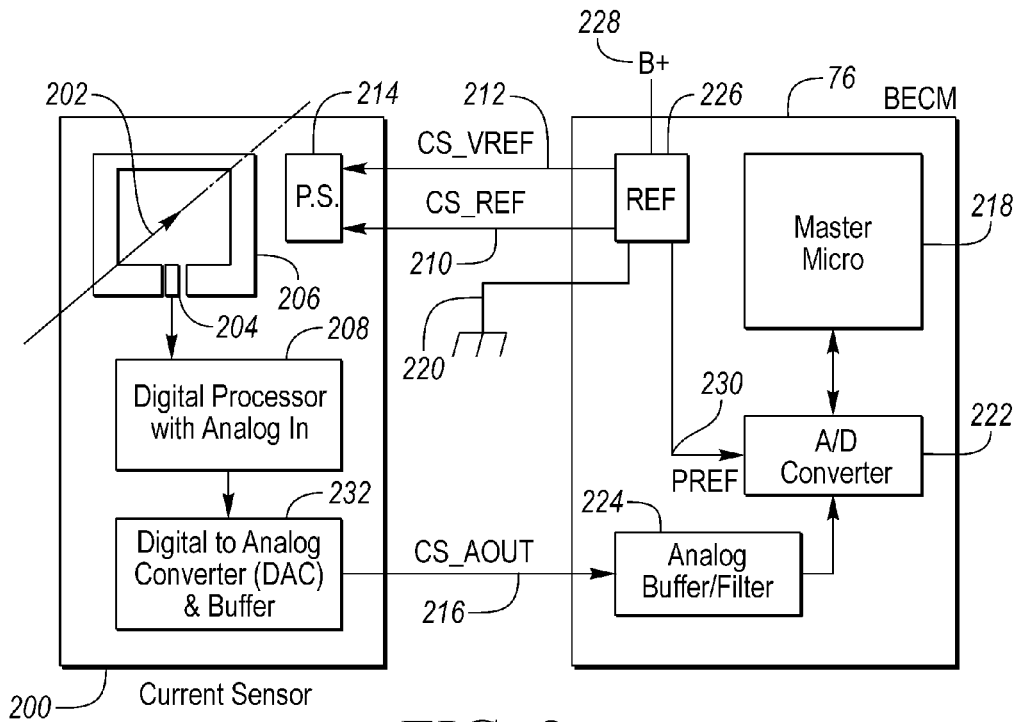
FIG. 3 is a diagram of an exemplary current sensor configuration.

FIG. 3 is a block diagram of a current sensor subsystem. The BECM 76 may receive an analog signal representing the current flowing in the battery. The current sensor 200 may interface with the BECM 76 via three conductors or wires. The conductors may be part of a wiring harness that couples the BECM 76 to the current sensor 200. The three conductors may transfer signals between the BECM 76 and the current sensor 200. The BECM 76 may provide a power supply and a precision voltage reference signal, CS_VREF 212, to the current sensor 200. The CS_VREF 212 signal may function as a combination power supply and reference voltage to the current sensor 200. The BECM 76 may also provide a voltage or ground reference, CS_REF 210, to the current sensor 200. The voltage generated on the CS_VREF 212 signal may be referenced to the CS_REF 210 ground reference signal.

The current sensor 200 may provide an analog voltage signal, CS_AOUT 216, to the BECM 76. The CS_AOUT 216 signal may be an analog voltage that may have values from zero volts up to the reference voltage, CS_VREF 212. The analog voltage on CS_AOUT 216 may be indicative of an amount of current flowing through the battery pack. The voltage output on CS_AOUT 216 and the current flowing through the battery may be related to one another by a mathematical relationship or function.

A current sensor module 200 may be present to measure the current flowing through the battery pack 24. The current sensor module 200 may include a power supply module 214. The power supply module 214 may receive the CS_VREF 212 and the CS_REF 210 signals and buffer the signals for distribution within the current sensor module 200. The power supply module 214 may provide power for the current sensor processor 208 and a reference voltage for a digital-to-analog converter (DAC) module 232.

The current sensor module 200 may further include an element 206 for concentrating flux. The flux concentrating element 206 may be a ferrite core or loop that is disposed around a conductor 202 that may carry current flowing through the battery pack. As current through the conductor 202 changes, the amount of flux passing through the flux concentrating element 206 may vary. A Hall effect sensor 204 may be included to provide an analog voltage that changes as the flux through the flux concentrating element 206 changes. A current sensing element may include the flux concentrating element 206 and the Hall effect sensor 204. The output of the Hall effect sensor 204 may be coupled to an analog input of the current sensor processor 208. The current sensor processor 208 may execute instructions to process the analog input from the Hall effect sensor 204 to provide an output to the DAC module 232.

The DAC 232 may receive a digital value as input and convert the digital value to an analog voltage output. The DAC module 232 may further buffer the analog voltage output before providing the analog output voltage signal CS_AOUT 216. The analog output voltage of the DAC 232 may be referenced to the reference voltage, CS_VREF 212. For example, a full-scale digital value may provide an analog output voltage that is equal to CS_VREF 212. Values that are less than the full-scale digital value may provide an analog output voltage that is equal to a percentage of the CS_VREF 212 defined by the ratio between the digital value provided to the DAC and the full-scale digital value. The full-scale digital value may vary depending on the resolution of the DAC.

The BECM 76 may include a microprocessor 218 and an analog to digital (A/D) converter 222. The BECM 76 may further include a reference voltage module 226 to provide a precision reference voltage signal 230. The precision reference voltage signal 230 may be provided to the A/D converter 222. The BECM 76 may include an analog buffer/filter module 224 to process the analog signal, CS_AOUT 216, received from the current sensor 200.

Figure 4:
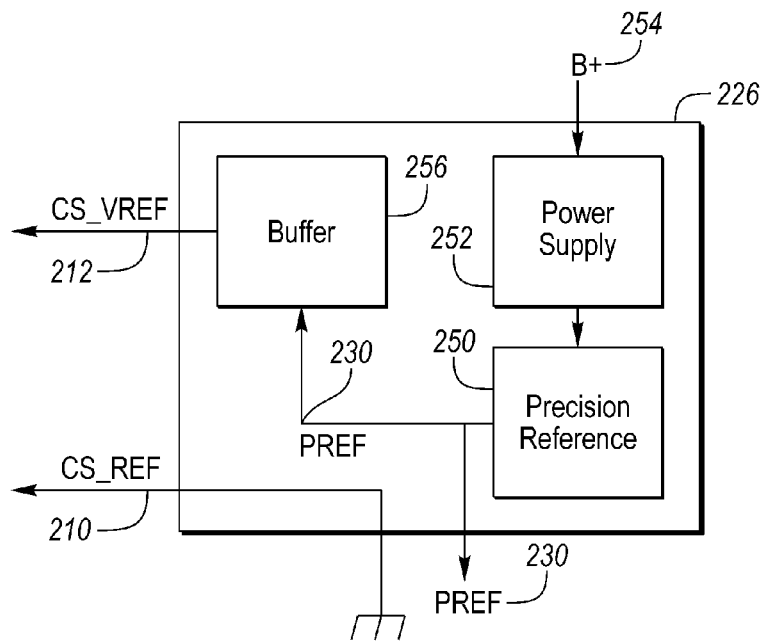
FIG. 4 is a diagram of an exemplary reference voltage generator configuration.

FIG. 4 depicts a block diagram of the reference voltage module 226. The reference voltage module 226 may include a power supply module 252 that receives a battery voltage, B+ 254, from the vehicle. The battery voltage, B+ 254, may be a 12 Volt power signal from the auxiliary battery. The power supply module 252 may process and convert the battery voltage 254 to a desired voltage level and provide a voltage output to a precision reference module 250.

The precision reference module 250 may convert a received voltage signal to a precision regulated voltage, PREF 230. The precision regulated voltage 230 may have a lower magnitude than the received voltage signal. The precision regulated voltage 230 may be provided to a buffer module 256. The buffer module 256 may provide an output voltage reference, CS_VREF 212, that is isolated from the precision voltage reference 230. As the reference voltage signal 212 may be connected to the current sensor 200 via a wiring harness, the buffer module 256 may isolate the precision voltage reference 230 signal from excessive current or impedance conditions that may occur within the wiring harness between the BECM 76 and the current sensor 200. The buffer module 256 may function such that the output voltage, CS_VREF 212, is substantially the same as the input voltage, PREF 230.

The precision voltage reference 230 may be provided to the A/D converter 222 in the BECM 76. The reference module 226 functions to ensure that the voltage reference, CS_VREF 212, that is provided to the current sensor 200 is at substantially the same voltage level as the precision voltage reference 230 that is provided to the A/D converter 222 of the BECM 76.

The reference module may also pass the ground reference, CS_REF 210, to the current sensor 200. A copper ground plane of the BECM 76 may be connected to a chassis reference ground 220 in the vehicle. The copper ground plane may be available within the reference module 226. The CS_REF 210 connection may be connected to the copper ground plane and may be at an equal potential with a BECM ground 220 that is connected to a chassis of the vehicle.

The A/D converter 222 in the BECM 76 may be a separate component or may be part of the BECM microprocessor 218. The A/D converter 222 operates to convert an analog voltage input into a digital value. The actual digital value may depend upon the voltage reference, PREF 230 and the resolution of the A/D converter 222. For example, when a full-scale voltage that is equal to the reference voltage 230 is applied to the input of the A/D converter 222, a full-scale digital value may be output. If the reference voltage 230 changes, the full-scale voltage input changes in response.

The BECM 76 may include an analog buffer/filter module 224 to process the analog signal, CS_AOUT 216, that represents the battery pack current value. The analog buffer/filter module 224 may filter the signal to eliminate unwanted noise and may buffer the signal such that conditions within the BECM 76 do not affect the CS_AOUT 216 signal. In addition, the analog buffer/filter module 224 may protect the other components of the BECM 76 from damaging current or impedance conditions on the analog signal 216 conductor. The output of the analog buffer/filter module 224 may be coupled to an analog input of the A/D converter 222.

The current sensor module 200 may periodically update the value of the analog output voltage 216. The microprocessor 218 in the BECM 76 may periodically sample the value of the analog output voltage 216. The sampling may be achieved by periodically transferring a value from the A/D converter 222. The A/D converter 222 may provide a value that is the product of a full-scale digital value and a ratio between the analog output voltage 216 and the precision reference voltage 230.

A typical current sensor may provide an analog output voltage that is linearly related to the current through the conductor being measured. To improve the signal being transferred to the BECM 76, the current sensor processor 208 may execute instructions to rescale the analog voltage output as a function of the current. As discussed previously, a vehicle may operate more often in a range of currents below a predetermined current level. The analog voltage output 216 may only have a predetermined maximum range in which to express all values of the current and may be limited by the reference voltage 212. A more thoughtful scaling of the analog voltage output 216 may allocate a larger voltage range to currents that are below the predetermined current level. Such a scaling may provide improved resolution of the analog voltage output 216 for currents below the predetermined current level. The improved resolution may improve control performance in functions in which the current feedback is utilized. For example, improved current control may be realized. In addition, better noise immunity may be realized as any noise induced signals will cause less deviation in the current measurement.

The current sensor processor 208 may convert the output of the Hall effect sensor 204 into a digital value. The current sensor processor 208 may scale the digital value into an actual current value in units of Amps. The output of the Hall effect sensor 204 may or may not be a linear function of the current. The current sensor processor 208 may include a lookup table to convert the digital value from the Hall effect sensor 204 to an actual current value in Amps. Alternatively, predetermined mathematical formulas may be implemented to perform the conversion. The current sensor processor 208 may then convert the actual current value into a digital output value for the DAC 232. The digital output value may be scaled such that a full-scale value provides a maximum voltage output. Digital output values less than the full-scale value provide an analog voltage output 216 that is a percentage of the reference voltage 212 based on a ratio of the digital output value to the full-scale value.

Figure 5:
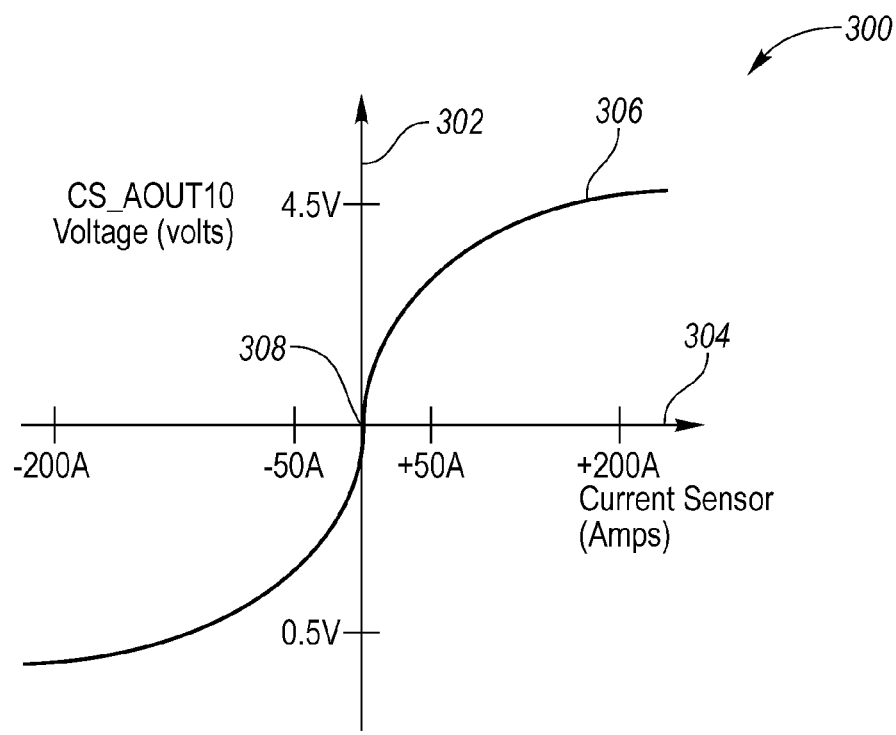
FIG. 5 is a plot of an exemplary exponential scaling function relating sensor output voltage to current.

The rescaling may be such that the analog output voltage 216 has a larger gain at lower values of current. That is, a given change in current yields a larger change in voltage output at lower current values than at high current values. The gain may also be considered as a rate of change of the analog output voltage with respect to the current. One example of such a gain function may be an exponential scaling function as depicted in FIG. 5. The graph 300 depicts an output voltage curve 306 and represents the voltage output for the range of current values of the current sensor. The y-axis 302 represents the analog output voltage, while the x-axis 304 represents the current sensor value. A zero current point 308 may be defined as a voltage on the curve 306 when the current is zero. The voltage at the zero current point 308 may be a non-zero voltage.

The rescaling may apply in the range of normal operating currents that occur when the current sensor output is not saturated. When the magnitude of the current is greater than a saturation current, the sensor output may no longer change in value. That is, an increase in current does not lead to an increase in the sensor output value.

The analog voltage output 216 may be scaled according to the following:

$$V_{out}\% = \frac{\left(2.5 + \left[2*\left(1 - e^{\frac{-Rf*HallCurrent}{FSC}}\right)\right]\right)}{V_{CS\_VREF}} \text{ for } HallCurrent \geq 0 \quad (1)$$

$$V_{out}\% = \frac{\left(2.5 - \left[2*\left(1 - e^{\frac{Rf*HallCurrent}{FSC}}\right)\right]\right)}{V_{CS\_VREF}} \text{ for } HallCurrent < 0 \quad (2)$$

where HallCurrent is the current flowing through the conductor 202 as measured by the Hall effect sensor in Amps, FSC is the full-scale current in Amps that is the largest current that the current sensor is designed to read accurately, $V_{CS\_VREF}$ is the reference voltage of the analog output voltage, Rf is a rescaling factor that is a positive, dimensionless constant typically in the range of 1 to 5, and $V_{out}\%$ is the percentage of the reference voltage that should be output.

Equations (1) and (2) provide a percentage of the reference voltage that should be output as the analog output voltage 216. The value of $V_{out}\%$ may be converted to a digital output value for the DAC 232 by multiplying $V_{out}\%$ by the full-scale digital value for the DAC 232. The digital output value may be transferred to the DAC 232. The DAC 232 may convert the digital output value into the analog output voltage 216.

The current sensor processor 208 may implement the formulas expressed in Equations (1) and (2). Alternatively, one or more lookup tables may be implemented that approximate the formulas. The current sensor processor 208 may periodically sample the output of the Hall effect sensor 204. The Hall effect sensor value may be converted to the actual current value. The voltage output value may then be calculated by executing the formulas described. The percentage voltage output value may be scaled for output to the DAC 232. The result is an analog voltage output 216 with the characteristic as shown in FIG. 5.

To improve the resolution and noise immunity at lower measured currents, the voltage output may be such that a rate of change of the voltage output with respect to the current decreases as a magnitude of the current increases. The decrease in the rate of change may occur continuously as the current increases or may occur at discrete points. The current value may be reconstructed from the voltage output by applying the inverse function. For example, by dividing by the voltage received by the predetermined rate of change for the voltage, the original current may be reconstructed. The BECM 76 may store a table that relates the gain or rate of change to the voltage value. Alternatively, the table may relate the current value directly to the voltage value.

The BECM 76 may receive the analog output voltage 216. The BECM 76 may execute a reverse transformation to the analog output voltage 216 to convert the value back to the actual current in Amps. The BECM 76 may apply an inverse of the gain to derive the battery current from the voltage signal.

The rescaling operation may substantially reduce electrical noise from the current value in the BECM 76. The effectiveness of the rescaling may depend upon the value chosen for Rf. As Rf is increased (e.g., approaches 5), the current sensor 200 may become more immune to electrical noise at low current levels. For lower values of Rf (e.g., 1) there may be little difference in noise immunity when compared to a system without rescaling. The gain in the lower current range may be set by the choice of Rf. By increasing the gain in the nominal current range, the noise immunity of the amp-hour integration may be improved. Electrical noise and other factors, such as analog offsets and quantization errors, get mixed with the analog output voltage 216 at a specific magnitude of error. When the analog output voltage 216 is converted back to the original scale by the BECM 76, the magnitude of any errors is reduced as the signal, along with any noise, is reduced back to the original level. In the nominal current range, the original current signal gain is increased and the inverse gain must be applied to reconstruct the original signal. However, any noise that enters into the measurement will also be multiplied by the inverse gain causing the amplitude of the noise to be reduced. The scheme described effectively reduces the magnitude of the noise signal in the nominal current range. The result is that noise immunity is improved in the nominal current range in which the vehicle may operate more frequently.

The A/D converter 222 may provide a value in counts that is a ratio between the signal voltage at the input and the reference voltage 230. A percentage value may be expressed as the ratio between the measured counts and the full scale counts. The full-scale counts may be the number of counts that would be provided if the signal voltage is equal to the reference voltage.

The current measurement may be affected by offset errors and offset calibration errors in the A/D converter 222. Offsets and biases in the A/D converter 222 may lead to errors in reading the current sensor value. A zero offset correction may be applied to correct for these issues. The zero offset correction may be computed by the BECM microprocessor 218 at a time when it is known that no current is flowing through the sensor. The A/D converter 222 may be sampled at ignition key-on while the contactors 42 are open. The analog output voltage 216 may be sampled under this zero-current condition to determine the zero offset correction.

The microprocessor 218 may execute instructions to convert the sampled signal into the current value in Amps. The current may be calculated using the following equations:

$$I_{Amps} = -\frac{FSC}{Rf} * \ln\left(-1 * \left[\frac{A2D - ZC}{0.4 * A2D_{max}} - 1\right]\right), \text{ when } \frac{A2D}{A2D_{max}} \geq 0.5 \quad (3)$$

$$I_{Amps} = \frac{FSC}{Rf} * \ln\left(-1 * \left[\frac{A2D - ZC}{0.4 * A2D_{max}} - 1\right]\right), \text{ when } \frac{A2D}{A2D_{max}} < 0.5 \quad (4)$$

where FSC and Rf are as described previously, $A2D_{max}$ is the maximum A/D converter count, ZC is the zero offset correction value in A/D counts, A2D is the A/D value for the voltage measurement. The above scaling and rescaling is based on the reference voltage being approximately 5 Volts. Similar equations may be derived for different values of the reference voltage.

Figure 6:
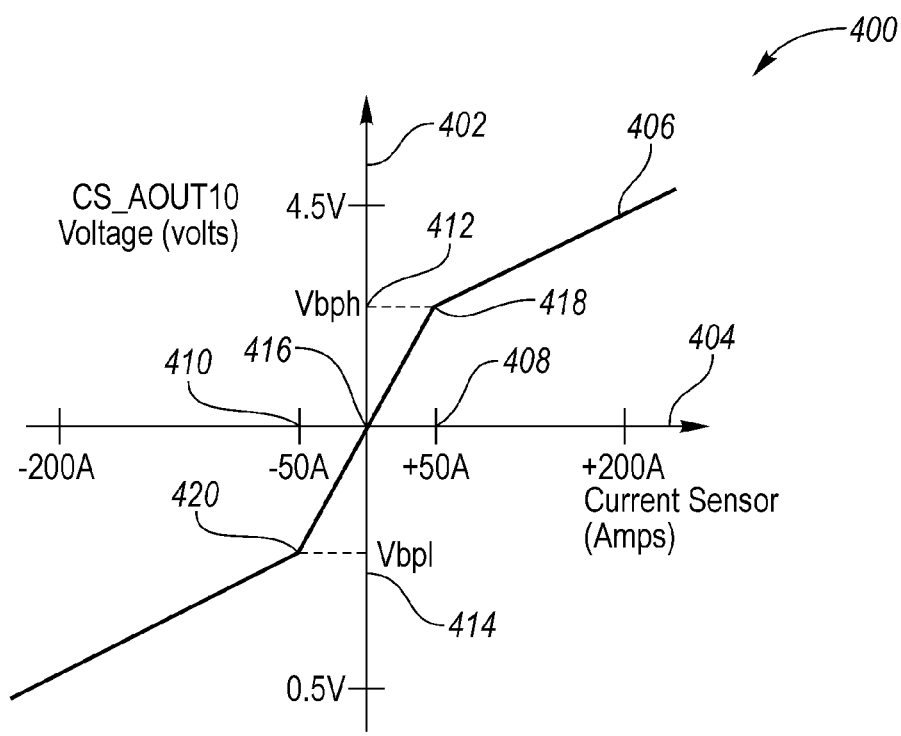
FIG. 6 is a plot of an exemplary piece-wise linear scaling function relating sensor output voltage to current.

The rescaling may also be a piecewise linear scaling that has a different gain in different current ranges. One example of such a function may be a piecewise linear scaling function as depicted in FIG. 6. The graph 400 depicts a piece-wise linear output voltage curve 406 and represents the voltage output for the range of current values of the current sensor. The y-axis 402 represents the analog output voltage, while the x-axis 404 represents the current sensor value. A zero current point 416 may be defined as a voltage on the curve 406 when the current is zero. The voltage at the zero current point 416 may be a non-zero voltage. Breakpoints 418, 420 may be defined as points at which the slope of the voltage curve changes. A positive current breakpoint 418 may be defined as the positive current 408 at which the slope changes. The voltage at the positive current breakpoint 418 may be defined as $V_{bph}$ 412. A negative current breakpoint 420 may be defined as the negative current 410 at which the slop changes. The voltage at the negative current breakpoint 420 may be defined as $V_{bpl}$ 414.

The voltage curve 406 exhibits a higher gain when a magnitude of the current is below a predetermined current 408, 410 and a lower gain above the predetermined current. The percentage of the reference voltage that is output on the analog output voltage may be given by the following:

$$V_{out}\% = \begin{cases} M1 * HallCurrent + B1, & HallCurrent \geq I_{bp} \\ M2 * HallCurrent + 50, & -I_{bp} < HallCurrent < +I_{bp} \\ M1 * HallCurrent + B2, & HallCurrent \leq -I_{bp} \end{cases} \quad (5)$$

where M1 and M2 are gain constants in units of percent per Amp, B1 and B2 are constants which set the offsets. The gain constants, M1 and M2, may be selected such that M2 is greater than M1. The offset constants, B1 and B2, may be selected such that each function associated with a current breakpoint yields the same percentage value at the piecewise linear current breakpoints 418, 420.

The current sensor processor 208 may convert the measured current value into an output voltage as defined by Equation (5). Using this function, the current is scaled such that currents less than a predetermined current (e.g., within the nominal current range) have a higher gain than those currents above the predetermined current (e.g., within the maximum current range).

The BECM 76 may convert the voltage to a current by implementing the inverse of the piecewise linear scaling as follows:

$$I = \begin{cases} \frac{(V_{out}\% - B1)}{M1}, & V_{out}\% \geq V_{bph}\% \\ \frac{V_{out}\% - 50}{M2}, & V_{bpl}\% < V_{out}\% < V_{bph}\% \\ \frac{(V_{out}\% - B2)}{M1}, & V_{out}\% \leq V_{bpl}\% \end{cases} \quad (6)$$

where $V_{out}\%$ is the voltage as a percentage of the reference voltage, the constants B1, B2, M1, and M2 are as defined previously, $V_{bph}\%$ is the voltage as a percentage of the reference voltage corresponding to positive current breakpoint 418, and $V_{bpl}\%$ is the voltage as a percentage of the reference voltage corresponding to the negative current breakpoint 420.

The expressions may be expressed as a function of A/D count values as follows:

$$I = \begin{cases} \frac{A2D\% + ZOC\% - B1\%}{M1}, & A2D \geq V_{bph}\% * FSC \\ \frac{A2D\% + ZOC\% - 50}{M2}, & V_{bpl}\% * FSC < A2D < V_{bph}\% * FSC \\ \frac{A2D\% + ZOC\% - B2\%}{M1}, & A2D \leq V_{bpl}\% * FSC \end{cases} \quad (7)$$

where A2D % is the A/D counts expressed as a percentage of the full-scale value (A2D*100/FSC), ZOC % is the zero offset correction expressed as a percentage of the full-scale value, $V_{bph}\%$ is the percentage of the full scale voltage at the positive current breakpoint 418, $V_{bpl}\%$ is the percentage of the full scale voltage at the negative current breakpoint 420, FSC is the number of counts at the full scale voltage, and A2D is the raw counts from the A/D converter.

The zero offset correction value 416 may be defined as a difference between one-half of the full scale A/D reading and the A/D counts measured when pack current is zero. This value corrects for any offsets between the current sensor 200 and the BECM 76.

The BECM 76 may measure a zero offset correction as described above. The zero offset correction may impact each of the breakpoints by a fixed offset amount. Correcting for the offset voltage involves shifting the curve down by the zero offset amount.

The system described may be further generalized as a method that may be implemented in one or more controllers. The system as described measures a battery pack current, but the scheme is applicable to any type of measurement. The general method may include a first step of measuring a value. The value may be a current measurement. A next step may be to rescale the measured value according to a function that has a decreasing gain for the output value as the measured value increases. The rescaled value may then be output as an analog signal. A second controller may receive the analog signal and may convert the analog signal to the measured value by implementing an inverse of the function.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery configured to operate at a current, during a drive cycle, in a nominal current range for a time greater than in a maximum current range; and
   a controller programmed to change an output voltage, in response to a change in the current, by a greater amount when the current is in the nominal current range than when the current is in the maximum current range.

2. The vehicle of claim 1 wherein the output voltage is defined by an exponential function of the current.

3. The vehicle of claim 1 wherein the output voltage is defined by a piecewise linear function of the current.

4. The vehicle of claim 1 wherein the output voltage is defined such that a ratio between a change in the output voltage and the change in the current decreases as a magnitude of the current increases.

5. The vehicle of claim 1 further comprising a second controller programmed to receive the output voltage and operate the battery according to a battery current derived from the output voltage.

6. The vehicle of claim 5 wherein the battery current is derived from the output voltage based on an inverse of a gain that defines the output voltage as a function of the current.

7. The vehicle of claim 5 wherein the second controller is further programmed to, in response to conditions indicative of the current being zero, measure a zero current voltage and further derive the battery current based on the zero current voltage.

8. A battery management system comprising:
   a controller programmed to measure a current from a battery configured to operate, during a drive cycle, at the current in a nominal current range for a time greater than in a maximum current range, and change a voltage, in response to a change in the current, by a greater amount when the current is in the nominal current range than when the current is in the maximum current range.

9. The battery management system of claim 8 wherein the voltage is defined by an exponential function of the current.

10. The battery management system of claim 8 wherein the voltage is defined by a piecewise linear function of the current.

11. The battery management system of claim 8 wherein the voltage is defined such that a ratio between a change in the voltage and the change in the current decreases as a magnitude of the current increases.

12. The battery management system of claim 8 further comprising a second controller programmed to receive the voltage and operate the battery according to a battery current derived from the voltage.

13. The battery management system of claim 12 wherein the battery current is derived from the voltage based on an inverse of a gain that defines the voltage as a function of the current.

14. The battery management system of claim 12 wherein the second controller is further programmed to, in response to conditions indicative of the current being zero, measure a zero current voltage and further derive the battery current based on the zero current voltage.

15. A method comprising:
   measuring, by a controller, a current from a battery configured to operate at the current in a nominal current range for a time greater than in a maximum current range; and
   changing, by the controller, an output voltage, in response to a change in the current, by a greater amount when the current is in the nominal current range than when the current is in the maximum current range.

16. The method of claim 15 wherein the output voltage is defined by an exponential function of the current.

17. The method of claim 15 wherein the output voltage is defined by a piecewise linear function of the current.

18. The method of claim 15 wherein the output voltage is defined such that a ratio between a change in the output voltage and the change in the current decreases as a magnitude of the current increases.

19. The method of claim 15 wherein the output voltage is defined such that a resolution of the current as represented by the output voltage is greater in the nominal current range than in the maximum current range.

20. The method of claim 15 further comprising:
receiving, by a second controller, the output voltage; and
operating, by the second controller, the battery according to a battery current derived from the output voltage.

* * * * *